US010135120B2

(12) United States Patent
Sakong et al.

(10) Patent No.: US 10,135,120 B2
(45) Date of Patent: *Nov. 20, 2018

(54) METHOD OF PROVIDING ANTENNA BY USING COMPONENT IN ELECTRONIC DEVICE AND THE ELECTRONIC DEVICE THEREFOR

(71) Applicant: Samsung Electronics Co., Ltd., Suwon-si, Gyeonggi-do (KR)

(72) Inventors: Min Sakong, Gumi-si (KR); Dong Ryul Shin, Daegu (KR); Joon Bo Park, Busan (KR); Eun Jin Lee, Gumi-si (KR); Byung Chan Jang, Gumi-si (KR); Jin Woo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,739

(22) Filed: Oct. 20, 2016

(65) Prior Publication Data
US 2017/0040675 A1  Feb. 9, 2017

Related U.S. Application Data

(63) Continuation of application No. 14/657,349, filed on Mar. 13, 2015, now Pat. No. 9,503,142.

(30) Foreign Application Priority Data

Mar. 14, 2014  (KR) .................. 10-2014-0029994

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1698* (2013.01); *H01Q 1/38* (2013.01); *H01Q 1/46* (2013.01);
(Continued)

(58) Field of Classification Search
CPC H01Q 1/243; H01Q 1/46; H01Q 1/48; H01Q 9/42; H04B 1/3833; G06F 1/1698
See application file for complete search history.

(56) References Cited

U.S. PATENT DOCUMENTS 7,184,808 B2  2/2007 Shoji
7,408,515 B2  8/2008 Leisten
(Continued)

FOREIGN PATENT DOCUMENTS

CN     1510885 A     7/2004
CN     101300717 A   11/2008
(Continued)

OTHER PUBLICATIONS

Chinese Office Action dated Apr. 28, 2018, issued in Chinese Patent Application No. 201580014113.X.
(Continued)

*Primary Examiner* — Ted Wang
(74) *Attorney, Agent, or Firm* — Jefferson IP Law, LLP

(57) ABSTRACT

An electronic device is provided. The electronic device includes a control signal generation unit configured to generate a control signal corresponding to a user input, a signal transmission unit configured to transmit the generated control signal to a signal processing unit, the signal processing unit configured to process the transmitted control signal, and a ground connection unit configured to connect a ground plate of the signal transmission unit and a ground plate of the signal processing unit, wherein the ground plate of the signal transmission unit and the ground plate of the
(Continued)

signal processing unit are spaced from each other and the ground plate of the signal transmission unit is used as a radiator.

16 Claims, 15 Drawing Sheets

(51) Int. Cl.
    *H01Q 1/46*     (2006.01)
    *H01Q 9/42*     (2006.01)
    *H01Q 1/48*     (2006.01)
    *H04B 1/3827*     (2015.01)
    *H01Q 1/38*     (2006.01)
    *H01Q 9/04*     (2006.01)

(52) U.S. Cl.
    CPC ............. *H01Q 1/48* (2013.01); *H01Q 9/0421* (2013.01); *H01Q 9/42* (2013.01); *H04B 1/3833* (2013.01)

(56) References Cited

U.S. PATENT DOCUMENTS

| | | |
|---|---|---|
| 8,395,553 B2 | 3/2013 | Oh |
| 2004/0106428 A1 | 6/2004 | Shoji |
| 2007/0040735 A1 | 2/2007 | Matsuo et al. |
| 2007/0063902 A1 | 3/2007 | Leisten |
| 2009/0278752 A1 | 11/2009 | Oh |
| 2011/0267240 A1 | 11/2011 | Kakitsu et al. |
| 2012/0194394 A1 | 8/2012 | Togashi et al. |
| 2012/0218163 A1 | 8/2012 | Wong et al. |
| 2014/0015723 A1 | 1/2014 | Cho et al. |
| 2014/0203968 A1 | 7/2014 | Hsu et al. |
| 2014/0370825 A1 | 12/2014 | Kim et al. |

FOREIGN PATENT DOCUMENTS

| | | |
|---|---|---|
| CN | 102273009 A | 12/2011 |
| EP | 1 422 787 A1 | 5/2004 |
| EP | 2 302 736 A1 | 3/2011 |
| GB | 2430556 | 3/2007 |
| JP | 2006-135721 A | 5/2006 |
| KR | 10-2007-0006349 A | 1/2007 |
| KR | 10-0753951 B1 | 8/2007 |
| KR | 10-1075995 B1 | 10/2011 |
| KR | 10-2012-0003532 A | 1/2012 |
| KR | 10-2013-0077362 A | 7/2013 |
| KR | 10-2014-0007645 A | 1/2014 |

OTHER PUBLICATIONS

European Patent Application dated Jul. 13, 2018, issued in the European Patent Application No. 15 159 108.8-1221.

METHOD OF PROVIDING ANTENNA BY USING COMPONENT IN ELECTRONIC DEVICE AND THE ELECTRONIC DEVICE THEREFOR

CROSS-REFERENCE TO RELATED APPLICATION(S)

This application is a continuation application of prior application Ser. No. 14/657,349, filed on Mar. 13, 2015, which claimed the benefit under 35 U.S.C. § 119(a) of a Korean patent application filed on Mar. 14, 2014 in the Korean Intellectual Property Office and assigned Serial number 10-2014-0029994, the entire disclosure of which is hereby incorporated by reference.

TECHNICAL FIELD

The present disclosure relates to a method of providing an antenna by using at least one component in an electronic device and the electronic device therefor.

BACKGROUND

Portable electronic devices such as smartphones, smartpads, notebooks, car navigation systems, motion pictures expert group (MPEG-1 or MPEG-2) audio layer 3 (MP3) players, and digital radios etc., may receive/transmit information from/to another electronic device with a built-in communication means via networks.

Such portable electronic devices include various functions such as television (TV) functions, internet access functions, and camera/camcorder functions. Additionally, users demand smaller, lighter, and easy to use designs due to the characteristics of portable electronic devices.

In order to satisfy the aesthetic desires of users demanding slim designs, the manufacturers of portable electronic devices use internal antennas instead of external antennas to allow the sizes of electronic devices to be smaller.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for implementing an antenna by using an internal configuration of an electronic device rather than mounting a complete antenna device inside the electronic device.

In accordance with an aspect of the present disclosure, an electronic device is provided. The electronic device includes a control signal generation unit configured to generate a control signal corresponding to a user input, a signal transmission unit configured to transmit the generated control signal to a signal processing unit, the signal processing unit configured to process the transmitted control signal, and a ground connection unit configured to connect a ground plate of the signal transmission unit and a ground plate of the signal processing unit, wherein the ground plate of the signal transmission unit and the ground plate of the signal processing unit are spaced from each other and the ground plate of the signal transmission unit is used as a radiator.

In accordance with another aspect of the present disclosure, a communication method of an electronic device is provided. The communication method includes generating, by a control signal generation unit, a control signal corresponding to a user input, transmitting, by a signal transmission unit, the generated control signal to a signal processing unit, and processing, by the signal processing unit, the transmitted control signal, wherein a ground plate of the signal transmission unit and a ground plate of the signal processing unit are spaced from each other and the ground plate of the signal transmission unit is used as a radiator.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
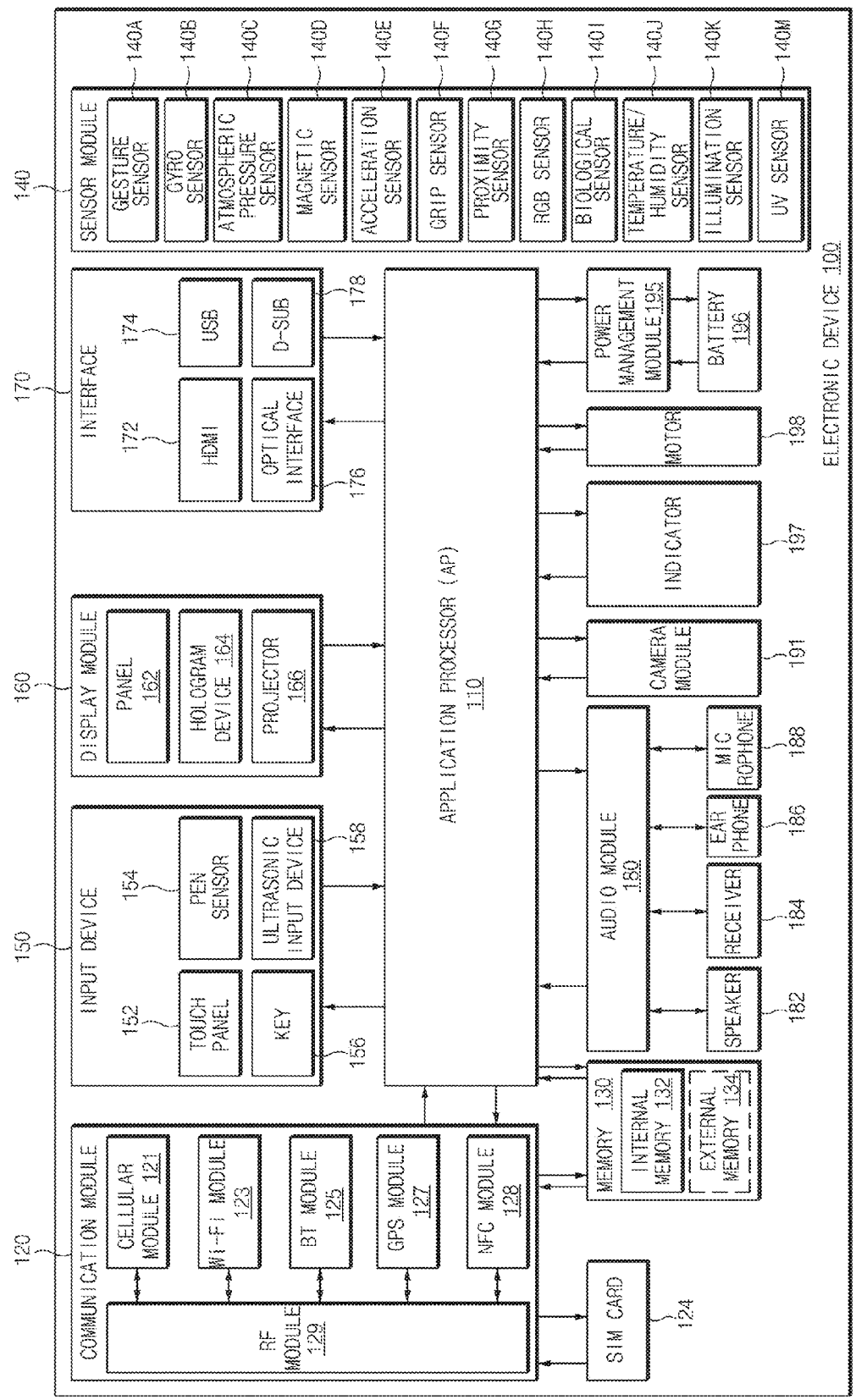
FIG. 1 is a block diagram illustrating hardware of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "have," "may include," "may comprise" and/or "may have" used in various embodiments of the present disclosure indicate disclosed functions, operations, or an existence of elements but do not exclude other functions, operations or elements. The meaning of "include," "comprise," "including," and/or "comprising," specifies a property, a region, a fixed number, a process, an element and/or a component but does not exclude other properties, regions, fixed numbers, processes, elements and/or components in various embodiments of the present disclosure.

According to various embodiments of the present disclosure, the meaning of the term "or" used herein includes any or all combinations of the words connected by the term "or." For instance, the expression "A or B" may indicate include A, B, or both A and B.

The terms such as "1st," "2nd," "first," "second," and the like used herein may refer to modifying various different elements of various embodiments of the present disclosure, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). In contrast, when an element is referred to as being "directly connected" and/or "directly coupled" to another element, there are no intervening elements present.

Terms used in various embodiments of the present disclosure are used to describe specific embodiments, and are not intended to limit the scope of the present disclosure.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning Additionally, an electronic device according to various embodiments of the present disclosure may be a device with a communication function. For instance, electronic devices according to various embodiments of the present disclosure may include at least one of smartphones, tablet personal computers (PCs), mobile phones, video phones, electronic book (e-book) readers, desktop PCs, laptop PCs, netbook computers, personal digital assistants (PDAs), portable multimedia players (PMPs), motion pictures expert group (MPEG-1 or MPEG-2) audio layer 3 (MP3) players, mobile medical devices, cameras, and wearable devices (e.g., head-mounted-devices (HMDs) such as electronic glasses, electronic apparel, electronic bracelets, electronic necklaces, electronic appcessories, electronic tattoos, and smart watches).

According to various embodiments of the present disclosure, the electronic devices may be smart home appliances having a communication function. The smart home appliances may include at least one of, for example, televisions (TVs), digital video disk (DVD) players, audio players, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to various embodiments of the present disclosure, the electronic devices may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, and security equipment.

According to various embodiments of the present disclosure, the electronic devices may include at least one of furniture or buildings/structures having a communication function, electronic boards, electronic signature receiving devices, projectors, and various measuring instruments (for example, a water measuring instrument, an electricity measuring instrument, a gas measuring instrument, and/or a radio signal measuring instrument). An electronic device according to various embodiments of the present disclosure may be one of the above-mentioned various devices or a combination thereof. Furthermore, it is apparent to those skilled in the art that an electronic device according to various embodiments of the present disclosure is not limited to the above-mentioned devices.

Hereinafter, an electronic device according to various embodiments will be described in more detail with reference to the accompanying drawings. The term "user" in various embodiments may refer to a person using an electronic device or a device using an electronic device (for example, an artificial intelligent electronic device).

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating hardware of an electronic device according to an embodiment of the present disclosure.

Referring to FIG. 1, an electronic device 100 is illustrated, where the electronic device 100 includes at least one application processor (AP) 110, a communication module 120, a subscriber identification module (SIM) card 124, a memory 130, a sensor module 140, an input device 150, a display module 160, an interface 170, an audio module 180, a camera module 191, a power management module 195, a battery 196, an indicator 197, and a motor 198.

The AP 110 may control a plurality of hardware or software components connected to the AP 110 and also may perform various data processing and operations with multimedia data by executing an operating system or an application program. The AP 110 may be implemented with a system on chip (SoC), for example. According to an embodiment, the AP 110 may further include a graphic processing unit (GPU) (not shown).

The communication module 120 may perform data transmission/reception in a communication with other electronic devices connected to the electronic device 100 through a network. According to an embodiment, the communication module 120 may include a cellular module 121, a Wi-Fi module 123, a Bluetooth (BT) module 125, a GPS module 127, a near field communication (NFC) module 128, and a radio frequency (RF) module 129.

The cellular module 121 may provide voice calls, video calls, text services, or internet services through a communication network (for example, long term evolution (LTE), LTE-Advanced (LTE-A), code division multiple access (CDMA), wideband CDMA (WCDMA), universal mobile telephone system (UMTS), wireless broadband (WiBro), and/or global system for mobile communications (GSM)). The cellular module 121 may identify and authenticate an electronic device in a communication network by using a SIM (for example, the SIM card 124), for example. According to an embodiment, the cellular module 121 may perform at least part of a function that the AP 110 provides. For example, the cellular module 121 may perform at least part of a multimedia control function.

According to an embodiment of the present disclosure, the cellular module 121 may further include a communication processor (CP). Additionally, the cellular module 121 may be implemented with a SoC, for example. As shown in FIG. 1, components such as the cellular module 121 (for example, a CP), the memory 130, and/or the power management module 195 are separated from the AP 110, but according to an embodiment, the AP 110 may be implemented including some of the above-mentioned components (for example, the cellular module 121).

According to an embodiment of the present disclosure, the AP 110 or the cellular module 121 (for example, a CP) may load instructions or data, which are received from a nonvolatile memory or at least one of other components connected thereto, into a volatile memory and then may process them. Furthermore, the AP 110 and/or the cellular module 121 may store data received from or generated by at least one of other components in a nonvolatile memory.

Each of the Wi-Fi module 123, the BT module 125, the GPS module 127, and the NFC module 128 may include a processor for processing data transmitted/received through a corresponding module, for example. Although the cellular module 121, the Wi-Fi module 123, the BT module 125, the GPS module 127, and the NFC module 128 are shown as separate blocks in FIG. 1, according to an embodiment of the present disclosure, some (for example, at least two) of the cellular module 121, the Wi-Fi module 123, the BT module 125, the GPS module 127, and the NFC module 128 may be included in one integrated chip (IC) or an IC package. For example, at least some (for example, a CP corresponding to the cellular module 121 and a Wi-Fi processor corresponding to the Wi-Fi module 123) among processors respectively corresponding to the cellular module 125, the Wi-Fi module 127, the BT module 128, the GPS module 121, and the NFC module 123 may be implemented with one SoC.

The RF module 129 may be responsible for data transmission/reception, for example, the transmission/reception of an RF signal. Although not shown in the drawings, the RF module 129 may include a transceiver, a power amp module (PAM), a frequency filter, or a low noise amplifier (LNA). Additionally, the RF module 129 may further include components for transmitting/receiving electromagnetic waves in a free space as a wireless communication, for example, conductors or conducting wires. Although the cellular module 121, the Wi-Fi module 123, the BT module 125, the GPS module 127, and the NFC module 128 share one RF module 129 shown in FIG. 1, according to an embodiment of the present disclosure, at least one of the cellular module 121, the Wi-Fi module 123, the BT module 125, the GPS module 127, and the NFC module 128 may perform the transmission of an RF signal through an additional RF module.

The SIM card 124 may be a card including a SIM and may be inserted into a slot formed at a specific location of an electronic device. The SIM card 124 may include unique identification information (for example, an integrated circuit card identifier (ICCID)) or subscriber information (for example, an international mobile subscriber identity (IMSI)).

The memory 130 may include an internal memory 132 and/or an external memory 134. The internal memory 132 may include at least one of a volatile memory (for example, dynamic random access memory (DRAM), static random access memory (SRAM), and synchronous dynamic RAM (SDRAM)) and a non-volatile memory (for example, one time programmable read only memory (OTPROM), programmable read only memory (PROM), erasable and programmable ROM (EPROM), electrically erasable and programmable ROM (EEPROM), mask ROM, flash ROM, Not AND (NAND) flash memory, and Not OR (NOR) flash memory).

According to various embodiments of the present disclosure, the internal memory 132 may be a Solid State Drive (SSD). The external memory 134 may further include flash drive, for example, compact flash (CF), secure digital (SD), Micro-SD, Mini-SD, extreme digital (xD), and/or a memory stick. The external memory 134 may be functionally connected to the electronic device 100 through various interfaces. According to an embodiment of the present disclosure, the electronic device 100 may further include a storage device (or a storage medium) such as a hard drive.

The sensor module 140 measures physical quantities and/or detects an operating state of the electronic device 100, thereby converting the measured or detected information into electrical signals. The sensor module 140 may include at least one of a gesture sensor 140A, a gyro sensor 140B, an atmospheric pressure sensor 140C, a magnetic sensor 140D, an acceleration sensor 140E, a grip sensor 140F, a proximity sensor 140G, a red, green, blue (RGB) sensor 140H, a biological sensor 140I, a temperature/humidity sensor 140J, an illumination sensor 140K, and an ultra violet (UV) sensor 140M. Additionally/alternatively, the sensor module 140 may include an E-nose sensor (not shown), an electromyography (EMG) sensor, an electroencephalogram (EEG) sensor (not shown), an electrocardiogram (ECG) sensor (not shown), a photoplethysmography sensor (PPG) (not shown), an infrared (IR) sensor (not shown), an iris sensor (not shown), and/or a fingerprint sensor (not shown). The sensor module 140 may further include a control circuit for controlling at least one sensor therein.

According to various embodiments of the present disclosure, the sensor module 140 may include various medical sensors in order to receive or provide information relating to the health of a user of the electronic device 100. For example, the sensor module 140 may include a PPG sensor. The PPG sensor may be attached to a portion such as a finger, a wrist, or a chest where a blood vessel passes and an appropriate contact for measurement occurs to sense information such as pulse wave, heart rate, and/or oxygen saturation (for example, peripheral capillary oxygen saturation (SPO2)). According to an embodiment, the sensor module 140 may include an ECG sensor. The ECG sensor may contact a portion of a finger, a palm, and/or a sole where an electrode contacts easily to obtain information such as heart rate or ECG. The electronic device 100 may obtain heart rate and/or oxygen saturation through a PPG sensor and/or an ECG sensor while a user sleeps, when stress occurs, and/or while a user exercises to determine a user's health state and/or emergency state.

According to an embodiment of the present disclosure, the sensor module 140 may include an EEG sensor. The EEG sensor may contact an appropriate portion, where an electronic contacts appropriately, such as a head, a forehead, and/or a temple close to a brain to obtain brainwave information. The electronic device 100 may determine a user's sleep state, stress state, and mode through the EEG sensor.

According to various embodiments of the present disclosure, the sensor module 140 may include a skin sensor such as a skin temperature sensor and/or a skin impedance sensor. The skin sensor may contact a portion where an electrode contacts easily to measure a temperature, a skin temperature at a measurement point (by using the skin temperature sensor), and/or a skin moisture level (by using the skin impedance sensor). The electronic device 100 may use data received through the skin sensor to provide service such as skin care.

According to various embodiments of the present disclosure, the sensor module 140 may include a body fat impedance sensor. The body fat impedance sensor may contact a portion such as a finger, a palm, and/or a sole where an electrode contacts easily. The body fat impedance sensor may measure the body fat of a measurement target (for example, a user).

According to various embodiments of the present disclosure, the sensor module 140 may include a galvanic skin response (GSR) sensor and/or a human flux (HF) sensor. The GSR sensor and/or the HF sensor may contact an appropriate portion of a skin where an electrode contacts easily. When the secretion of sweat is increased due to the increase in human body's activity, conductivity may be increased but resistance may be decreased. For example, a low galvanic skin resistance obtained through the GSR sensor may represent a tense state and a high galvanic skin resistance may represent a relatively relaxed state. Additionally, the HF sensor may detect a rate at which heat flows by comparing the temperatures of two points of a skin to obtain a temperature difference. The GSR sensor and/or the HF sensor may be used to obtain a state such as a sleep state and a stress state.

According to various embodiments of the present disclosure, the sensor module 140 may include a blood glucose measurement sensor. The blood glucose measurement sensor may include various sensors through a blood collection method, a reverse osmosis method, and an electrochemical measurement method. Blood glucose may be used to obtain a user's blood glucose level periodically or non-periodically.

The input device 150 may include a touch panel 152, a pen sensor 154, a key 156, and/or an ultrasonic input device 158. The touch panel 152 may recognize a touch input through at least one of capacitive, resistive, infrared, and/or ultrasonic methods, for example. Additionally, the touch panel 152 may further include a control circuit. In the case of the capacitive method, both direct touch and proximity recognition are possible. The touch panel 152 may further include a tactile layer. In this case, the touch panel 152 may provide a tactile response to a user.

The pen sensor 154 may be implemented through a method similar or identical to that of receiving a user's touch input or an additional sheet for recognition. The key 156 may include a physical button, an optical key, and/or a keypad, for example. The ultrasonic input device 158, as a device checking data by detecting sound waves through a microphone (for example, a microphone 188) in the electronic device 100, may provide wireless recognition through an input tool generating ultrasonic signals. According to an embodiment, the electronic device 100 may receive a user input from an external device (for example, a computer or a server) connected to the electronic device 100 through the communication module 120.

The display module 160 may include a panel 162, a hologram device 164, and/or a projector 166. The panel 162 may include a liquid-crystal display (LCD) and/or an active-matrix organic light-emitting diode (AM-OLED). The panel 162 may be implemented to be flexible, transparent, and/or wearable, for example. The panel 162 and the touch panel 152 may be configured with one module. The hologram 164 may show three-dimensional images in the air by using the interference of light. The projector 166 may display an image by projecting light on a screen. The screen, for example, may be placed inside or outside the electronic device 100. According to an embodiment of the present disclosure, the display module 160 may further include a control circuit for controlling the panel 162, the hologram device 164, and/or the projector 166.

The interface 170 may include a high definition multimedia interface (HDMI) 172, a universal serial bus (USB) 174, an optical interface 176, and/or a D-subminiature (D-sub) 178, for example. Additionally/alternately, the interface 170 may include a mobile high-definition link (MHL) interface, an SD card/multi-media card (MMC) interface, and/or an infrared data association (IrDA) standard interface.

The audio module 180 may convert sound into electrical signals and convert electrical signals into sounds. At least some components of the audio module 180 may be included in the input/output interface 140 shown in FIG. 1, for example. The audio module 180 may process sound information inputted/outputted through a speaker 182, a receiver 184, an earphone 186, and/or the microphone 188.

The camera module 191, as a device for capturing a still image and a video, may include at least one image sensor (for example, a front sensor or a rear sensor), a lens (not shown), an image signal processor (ISP) (not shown), and/or a flash (not shown) (for example, an LED or a xenon lamp).

The power management module 195 may manage the power of the electronic device 100. Although not shown in the drawings, the power management module 195 may include a power management IC (PMIC), a charger IC, and/or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 196, and/or a voltage, current, and/or temperature of the battery 196 during charging. The battery 196 may store or generate electricity and may supply power to the electronic device 100 by using the stored or generated electricity. The battery 196, for example, may include a rechargeable battery and/or a solar battery.

The indicator 197 may display a specific state of the electronic device 100 or part thereof (for example, the AP 110), for example, a booting state, a message state, and/or a charging state. The motor 198 may convert electrical signals into mechanical vibration. Although not shown in the drawings, the electronic device 100 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device 100 according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, and/or may further include another component. Additionally, some of components in an electronic device according to various embodiments of the present disclosure are configured as one entity, so that functions of previous corresponding components are performed identically.

The term "module" used in this disclosure, for example, may mean a unit including a combination of at least one of hardware, software, and firmware. The term "module" and the terms "unit," "logic," "logical block," "component," and/or "circuit" may be interchangeably used. A "module" may be a minimum unit or part of an integrally configured component. A "module" may be a minimum unit performing at least one function or part thereof. A "module" may be implemented mechanically and/or electronically. For example, a "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) and/or a method (for example, operations) according to this disclosure, for example, as in a form of a programming module, may be implemented using an instruction stored in a non-transitory computer-readable storage media. When at least one processor (for example, the processor 110) executes an instruction, it may perform a function corresponding to the instruction. The non-transitory computer-readable storage media may include the memory 130, for example. At least part of a programming module may be implemented (for example, executed) by the processor 110, for example. At least part of a programming module may include a module, a program, a routine, sets of instructions, and/or a process to perform at least one function, for example.

A module or a programming module according to the present disclosure may include at least one of the above-mentioned components, may not include some of the above-mentioned components, or may further include another component. Operations performed by a programming module or other components according to the present disclosure may be executed through a sequential, parallel, repetitive or heuristic method. Additionally, some operations may be executed in a different order or may be omitted. Or, other operations may be added.

The computer-readable storage media may include Magnetic Media such as a hard disk, a floppy disk, and a magnetic tape, Optical Media such as Compact Disc ROM (CD-ROM) and DVD, Magneto-Optical Media such as Floptical Disk, and a hardware device especially configured to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of this disclosure and vice versa according to various embodiments of the present disclosure.

A module or a programming module according to the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method.

Additionally, some operations may be executed in a different order or may be omitted. Alternatively, other operations may be added.

Also, various embodiments shown in this specification and drawings are provided as specific examples to describe technical content and help understanding and also do not limit the scope of the present disclosure. Accordingly, it should be interpreted that besides the embodiments listed herein, all modifications or modified forms derived based on the technical ideas of the present disclosure are included in the scope of the present disclosure.

The communication module 120 of the electronic device 100 may correspond to an antenna implemented in an electronic device 200 of FIG. 2, as described below. For example, an antenna implemented in the electronic device 200 may perform communication through the cellular module 121, the Wi-Fi module 123, the BT module 125, the GPS module 127, the NFC module 128, and/or the RF module 129.

Figure 2:
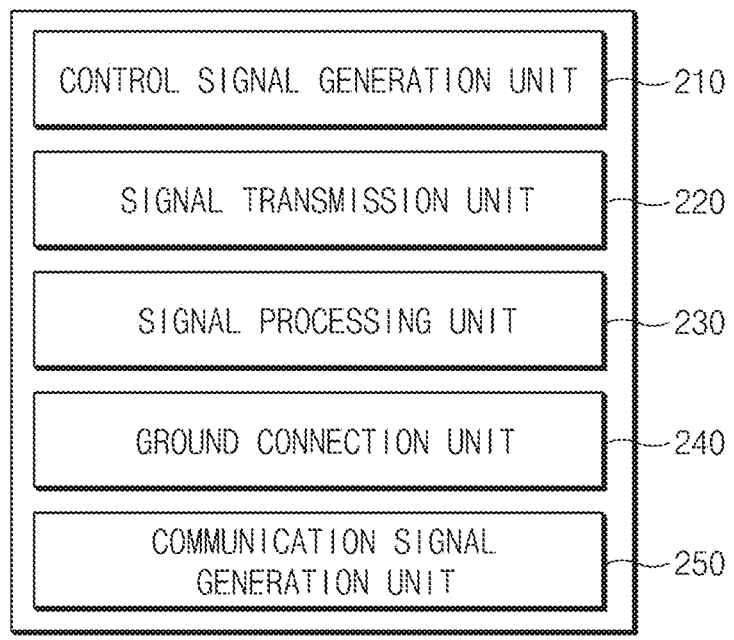
FIG. 2 is a block diagram of an electronic device according to an embodiment of the present disclosure.

However, the antenna implemented in the electronic device 200 of FIG. 2 and/or an antenna implemented in an electronic device to be mentioned after FIG. 2 may not be limited to corresponding to the communication module 120 of the electronic device 100 of FIG. 1. For example, an antenna according to various embodiments of the present disclosure may be extensively applied to various communication fields that will be developed in the future.

FIG. 2 is a block diagram of an electronic device according to an embodiment of the present disclosure.

Referring to FIG. 2, an electronic device 200 is illustrated, where the electronic device 200 may include a control signal generation unit 210, a signal transmission unit 220, a signal processing unit 230, a ground connection unit 240, and a communication signal generation unit 250. However, the electronic device 200 shown in FIG. 2 is just one embodiment of the present disclosure and its several modifications are possible based on components shown in FIG. 2. For example, the electronic device 200 may further include a user interface for receiving some instructions or information from a user. In this case, the user interface may be an input device such as a keyboard and a mouse in general but may be a graphical user interface (GUI) displayed on an image display device.

The control signal generation unit 210 may generate a control signal corresponding to a user input. At this point, the user input may relate to a manipulation of a volume button or a power button of the electronic device 200. For example, when a user presses (or, click, touch or activate) a volume down button to reduce the volume of a video being played by the electronic device 200, the control signal generation unit 210 may generate a control signal for requesting the volume down. Similarly, when the user presses a power button for activating the electronic device 200, the control signal generation unit 210 may generate a control signal corresponding thereto.

The volume button or the power button may be disposed at a side of the electronic device 200.

However, the user input is not limited to a button equipped at the side and extends to a physical button disposed at another portion of the electronic device 200. For example, a volume button or a home button may be disposed at the front or the rear of the electronic device 200.

Further, the user input may be input via a sensor (for example, the sensor included in the sensor module 140 of FIG. 1) mounted at the electronic device 200 in addition to the physical button of the electronic device 200. For example, when a proximity sensor (for example, the proximity sensor 140G of FIG. 1) of the electronic device 200 detects that an arbitrary object (for example, a user's finger or face) approaches the electronic device 200, the control signal generation unit 210 may generate a control signal for notifying this.

The signal transmission unit 220 may transmit the control signal generated by the control signal generation unit 210 to the signal processing unit 230. According to various embodiments of the present disclosure, the signal transmission unit 220 may include a printed circuit board (PCB), a Flexible PCB (FPCB), or a conductive material.

According to various embodiments of the present disclosure, the signal transmission unit 220 may include a signal line and/or a ground plate of the PCB, the FPCB, or the conductive material.

The signal line is a line that mutually connects the control signal generation unit 210 and the signal processing unit 230, wherein one end of the signal line may be formed on a ground plate of the signal transmission unit 220 and the other end of the signal line may be formed on a ground plate of the signal processing unit 230. For example, the signal line may connect the control signal generation unit 210 and the signal processing unit 230, crossing over the ground plate of the signal transmission unit 220 and the ground plate of the signal processing unit 230.

The signal line may include an inductor and/or an RF choke (RFC). The inductor and/or RFC may be electrically shorted in direct current (DC) or low frequency and may be electrically open in high frequency.

In various embodiments of the present disclosure, since a control signal generated by the control signal generation unit 210 is of DC or low frequency, the signal line may be shorted and the control signal may be transmitted from the control signal generation unit 210 to the signal processing unit 230 through the shorted signal line.

On the contrary, since a communication signal generated by the communication signal generation unit 250 is of high frequency, the inductor and/or RFC may be open. In this case, it is same as that the signal line between the control signal generation unit 210 and the signal processing unit 230 is disconnected so that it may not deliver the communication signal.

The signal processing unit 230 may process the control signal generated by the control signal generation unit 210 and then received through the signal transmission unit 220. The signal processing unit 230 may reduce the volume of a video being played in the electronic device 200 in response to the above-mentioned control signal requesting volume down.

The ground connection unit 240 may mutually connect the ground plate of the signal transmission unit 220 and the ground plate of the signal processing unit 230. The ground plate of the signal transmission unit 220 may be described as the ground plate of the control signal generation unit 210. At this point, the ground plate of the signal transmission unit 220 and the ground plate of the signal processing unit 230 may be spaced apart from each other and may be connected through only the ground connection unit 240. In this case, the electronic device 200 may utilize the broad ground plate of the signal transmission unit 220 corresponding to the button separated from the ground plate of the signal processing unit 230 as a radiator. Therefore, according to various embodiments of the present disclosure, the volume for the radiator may be obtained easily and also, it is possible to implement a low-priced antenna without an additional implementation and a complex design of an antenna.

According to various embodiments of the present disclosure, the ground connection unit 240 may be shorted always but according to another embodiment, the ground connection unit 240 may include an inductor and/or an RFC similarly to the signal line. That is, in this case, the ground connection unit 240 is shorted when the control signal is generated, and is opened when the communication signal is generated.

Additionally, an appropriate position of the ground connection unit 240 may be determined according to the radial of the ground plate of the signal transmission unit 220 that is to be utilized as an antenna.

The communication signal generation unit 250 may generate the communication signal in order to perform communication by using a configuration of the electronic device 200. Furthermore, the electronic device 200 may further include a communication line (not shown) that mutually connects the communication signal generation unit 250 and the ground plate of the signal transmission unit 220.

The communication line may include a matching circuit. Accordingly, the communication line may be open in DC or low frequency and may be shorted in high frequency based on a frequency characteristic of the matching circuit. According to various embodiments of the present disclosure, since a communication signal generated by the communication signal generation unit 250 is of high frequency, it may short the communication line. On the contrary, as mentioned above, since a control signal generated by the control signal generation unit 210 is of DC or low frequency, it may open the communication line.

In various embodiments of the present disclosure, the communication line, as a matching circuit, may include a tunable or switch device in addition to a simple lumped device.

It is apparent to those skilled in the art that the signal generation unit 210, the signal transmission unit 220, the signal processing unit 230, the ground connection unit 240, and the communication signal generation unit 250 are implemented separately or at least one of them is integrated and implemented.

Hereinafter, the role of the above-mentioned configuration of the electronic device 200 will be described in more detail by using various internal configurations of the electronic device 200.

Figure 3A:
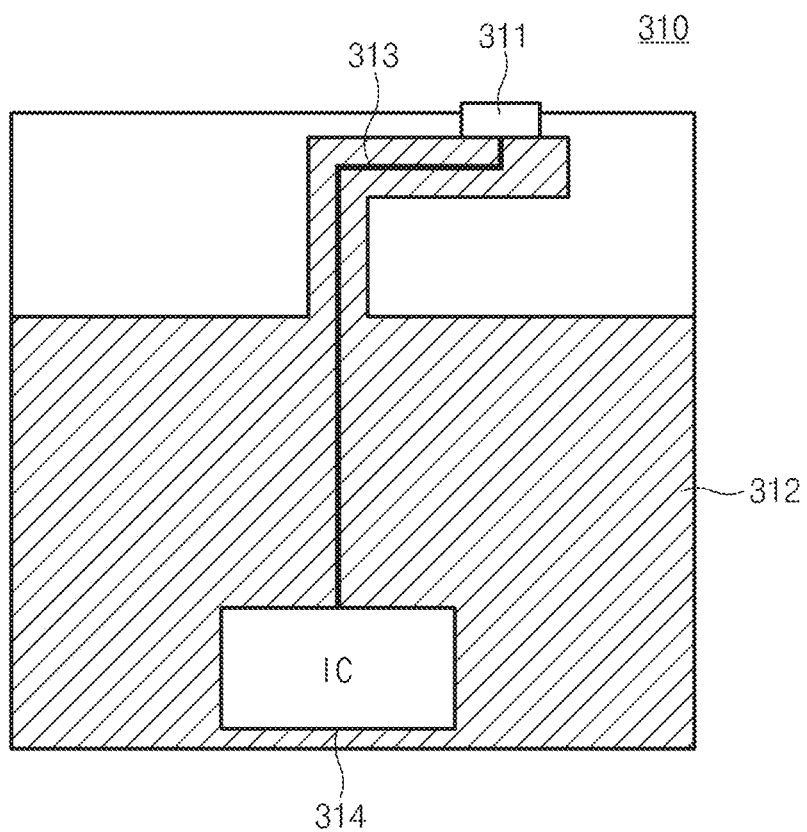
FIG. 3A is an internal diagram of an electronic device according to the related art.

FIG. 3A is an internal configuration of an electronic device according to the related art.

Referring to FIG. 3A, an electronic device 310 of the related art is illustrated, where the electronic device 310 may include a power button 311, a ground plate 312, a signal line 313, and a signal processing unit (e.g., an IC) 314.

Herein, the ground plate 312 may be one ground plate and two ground plates attached to each other. Additionally, since the signal line 313 does not include an additional inductor or RFC, it may short the power button 311 and the signal processing unit 314, while being shorted regardless of a high frequency communication signal.

Additionally, various kinds of patterns (for example, a printed circuit) necessary for implementing a function of the electronic device 310 may be printed on the ground plate 312. However, in order to prevent the present disclosure from being limited by including such various patterns in the drawings shown in FIGS. 3A to 7B to be described below, the various patterns corresponding to various embodiments of the present disclosure will be displayed as slashes on FIGS. 3A to 7B.

Figure 3B:
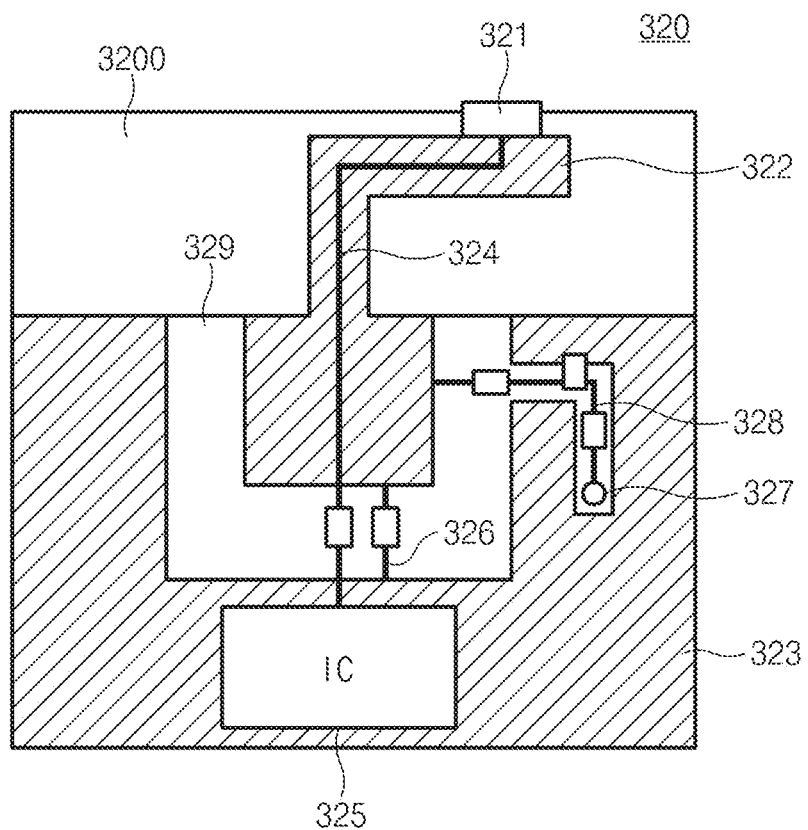
FIG. 3B is an internal diagram of an electronic device according to an embodiment of the present disclosure.

FIG. 3B is an internal diagram of an electronic device according to an embodiment of the present disclosure.

Referring to FIG. 3B, an electronic device 320 is illustrated, where the electronic device 320 may include an area 3200, a power button 321, a ground plate 322 of a signal transmission unit, a ground plate 323 of a signal processing unit, a signal line 324, a signal processing unit (e.g., an IC) 325, a ground connection unit 326, a communication signal generation unit 327, a communication line 328, and a fill-cut area 329.

Figure 3C:
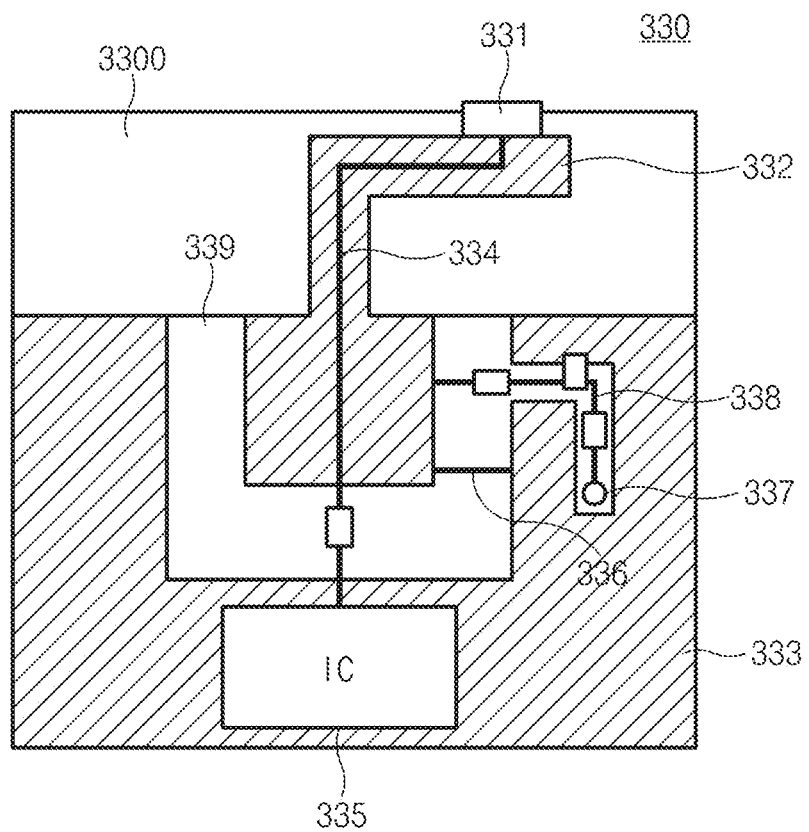
FIG. 3C is an internal diagram of an electronic device according to an embodiment of the present disclosure.

FIG. 3C is an internal diagram of an electronic device according to an embodiment of the present disclosure.

Referring to FIG. 3C, an electronic device 330 is illustrated, where the electronic device 330 may include an area 3300, a power button 331, a ground plate 332 of a signal transmission unit, a ground plate 333 of a signal processing unit, a signal line 334, a signal processing unit (e.g., an IC) 335, a ground connection unit 336, a communication signal generation unit 337, a communication line 338, and a fill-cut area 339.

Unlike the electronic device 310 of the related art, the electronic device 320 of FIG. 3B includes two spaced ground plates (for example, the ground plate 322 of the signal transmission unit and the ground plate 323 of the signal processing unit) rather than one ground plate. The spaced ground plates 322 and 323 may be separated with the fill-cut area 329 therebetween.

Furthermore, the area 3200 may be an empty space between a housing of the electronic device 320 and a substrate (for example, the ground plate 322 of the signal transmission unit, the ground plate 323 of the signal processing unit, and the fill-cut area 329) inside the electronic device 320. However, the area 3200 is not limited to the empty space and according to various embodiments of the present disclosure, the area 3200 may be an FPCB without a ground area.

Furthermore, the volume of the empty space in the area 3200 may vary according to the form of the ground plate 322 of the signal transmission unit. For example, when the ground plate 322 of the signal transmission unit is an FPCB with flexibility, the volume of the area 3200 may be reduced due to the folding of the ground plate 322 of the signal transmission unit.

Additionally, unlike the electronic device 310 of the related art, the electronic device 320 may include the signal line 324 and ground connection unit 326 including an inductor or an RFC and may include an additional communication signal generation unit 327 and communication line 328 including a matching circuit.

Unlike the electronic device 320 of FIG. 3B, the electronic device 330 of FIG. 3C does not include an additional inductor or RFC in the ground connection unit 336. Since the other configurations correspond to those of the electronic device 320, redundancy descriptions are omitted.

Hereinafter, operations of the electronic device 310 of the related art, the electronic device 320, and the electronic device 330 will be described with reference to FIGS. 4A to 4C.

Figure 4A:
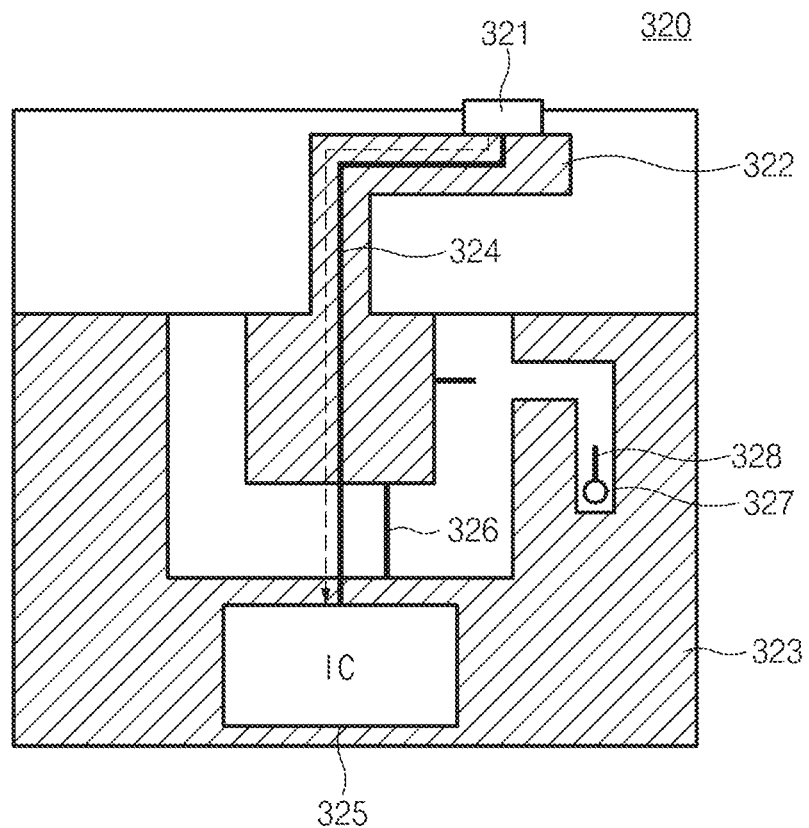
FIG. 4A is a view illustrating a flow of a control signal generated in an electronic device according to an embodiment of the present disclosure.

FIG. 4A is a view illustrating a flow of a control signal generated by an electronic device according to an embodiment of the present disclosure.

As described with reference to FIG. 2, since a control signal is of DC or low frequency, it may short an inductor or an RFC, and may open a matching circuit. Similarly, since a communication signal is of high frequency, it may open an inductor or an RFC, and may short a matching circuit. With this in mind, FIGS. 4A to 4C will be described.

Referring to FIG. 4A a flow of a control signal in the electronic device 320 of FIG. 3B is illustrated, where the signal line 324 and the ground connection unit 326 of the electronic device 320 may be shorted. Accordingly, the control signal may be transmitted from the power button 321 to the signal processing unit (e.g., the IC) 325 through the signal line 324 and the ground connection unit 326 may be grounded. On the contrary, since the communication line 328 is open, it may not pass the communication signal.

According to another embodiment of the present disclosure, in the case of the electronic device 330 of FIG. 3C, since the ground connection unit 336 does not include an additional inductor or RFC, it may be shorted regardless of the control signal.

Figure 4B:
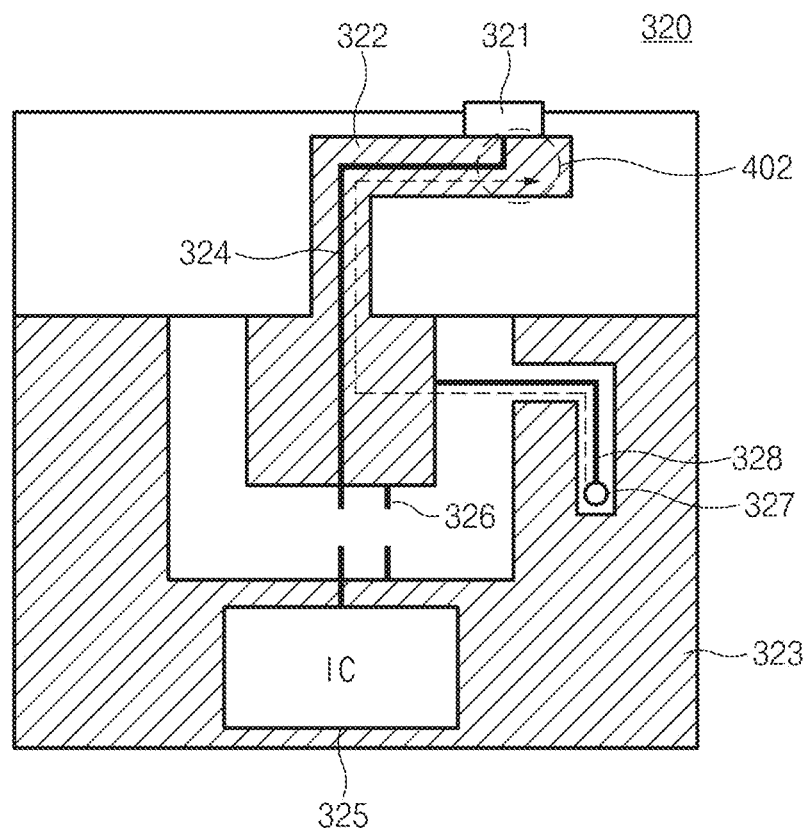
FIG. 4B is a view illustrating a flow of a communication signal generated in an electronic device according to an embodiment of the present disclosure.

FIG. 4B is a view illustrating a flow of a communication signal generated in an electronic device according to an embodiment of the present disclosure.

Referring to FIG. 4B a flow of a communication signal in the electronic device 320 of FIG. 3B is illustrated, where the signal line 324 and the ground connection unit 326 of the electronic device 320 may be opened not to pass a signal. On the contrary, the communication line 328 may be shorted thereby transmitting the communication signal generated by the communication signal generation unit 327 from the communication signal generation unit 327 to the ground plate 322 of a signal transmission unit. An area 402 on the ground plate 322 of the signal transmission unit of FIG. 4B may be an example of an area used as a radiator.

An antenna implemented in FIG. 4B may operate as a folded mono pole antenna in which the end part of the ground plate 322 of the signal transmission unit is folded.

Figure 4C:
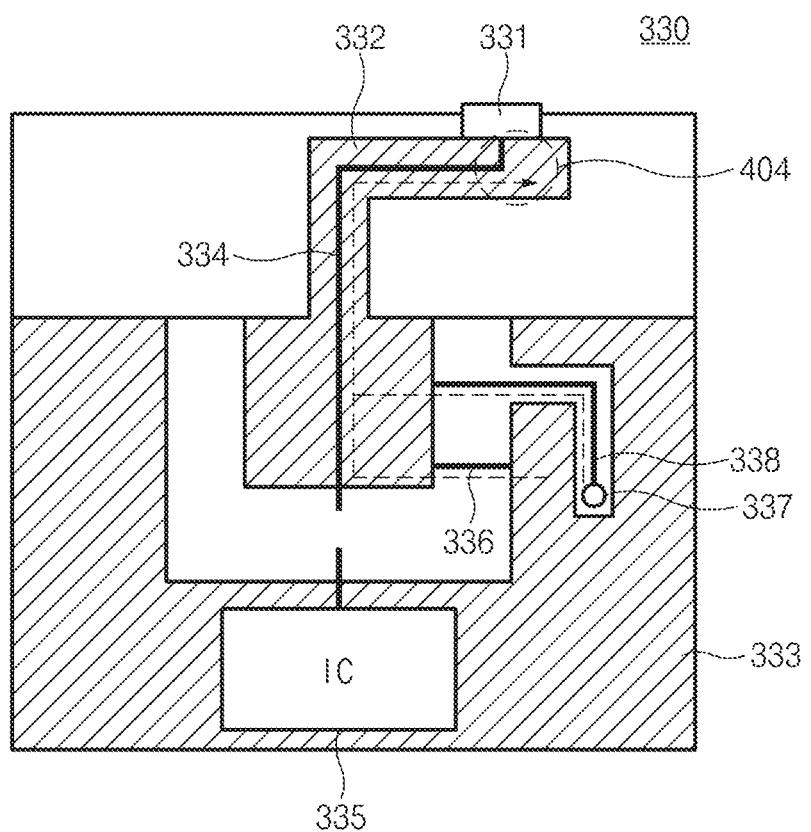
FIG. 4C is a view illustrating a flow of a communication signal generated in an electronic device according to an embodiment of the present disclosure.

FIG. 4C is a view illustrating a flow of a communication signal generated in an electronic device according to an embodiment of the present disclosure.

Referring to FIG. 4C, an electronic device 330 is illustrated, where the electronic device includes a signal line 334 and a power button 331, and where FIG. 4C may correspond to the embodiment of FIG. 4B except that a ground connection unit 336 is shorted. Accordingly, a communication line 338 may deliver a communication signal generated by a communication signal generation unit 337 from the communication signal generation unit 337 to a ground plate 332 of a signal transmission unit, and in this case, an area 404 on the ground plate 332 of the signal transmission unit may be one example of an area used as a radiator.

An antenna implemented in FIG. 4C may contact a ground plate 333 of signal processing unit (e.g., an IC) 335 to operate as a planar inverted f antenna (PIFA).

According to various embodiments of the present disclosure, in order for the design of a multi-band antenna, the electronic devices 320 and 330 may additionally implement at least one radiator according to a necessary frequency band, thereby forming a multi-resonant antenna.

Figure 5A:
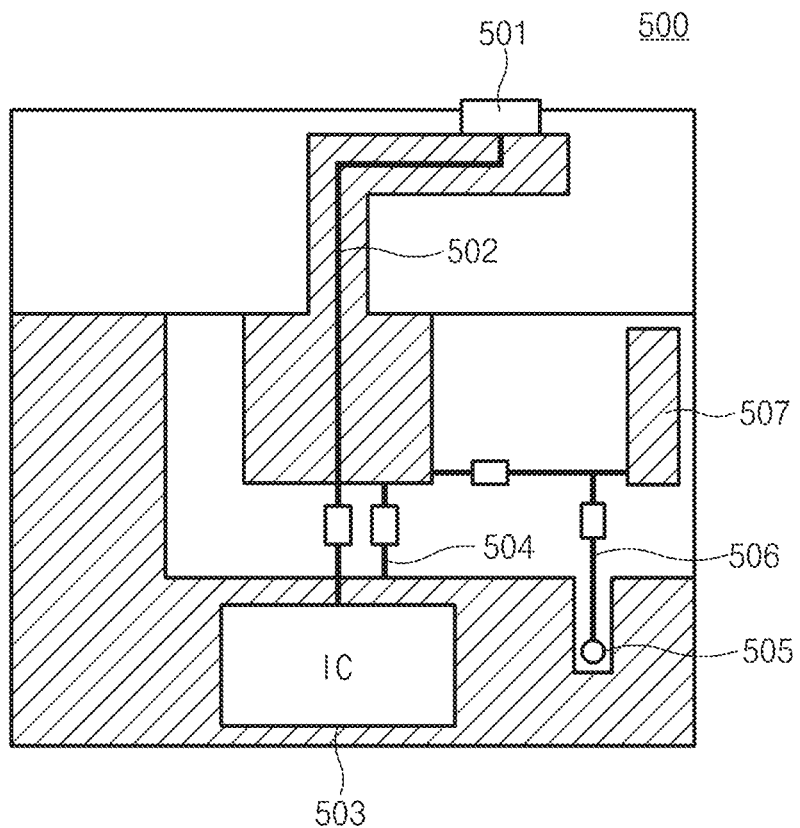
FIG. 5A illustrates an internal diagram of an electronic device and illustrates a flow of a communication signal generated in the electronic device according to an embodiment of the present disclosure.
Figure 5B:
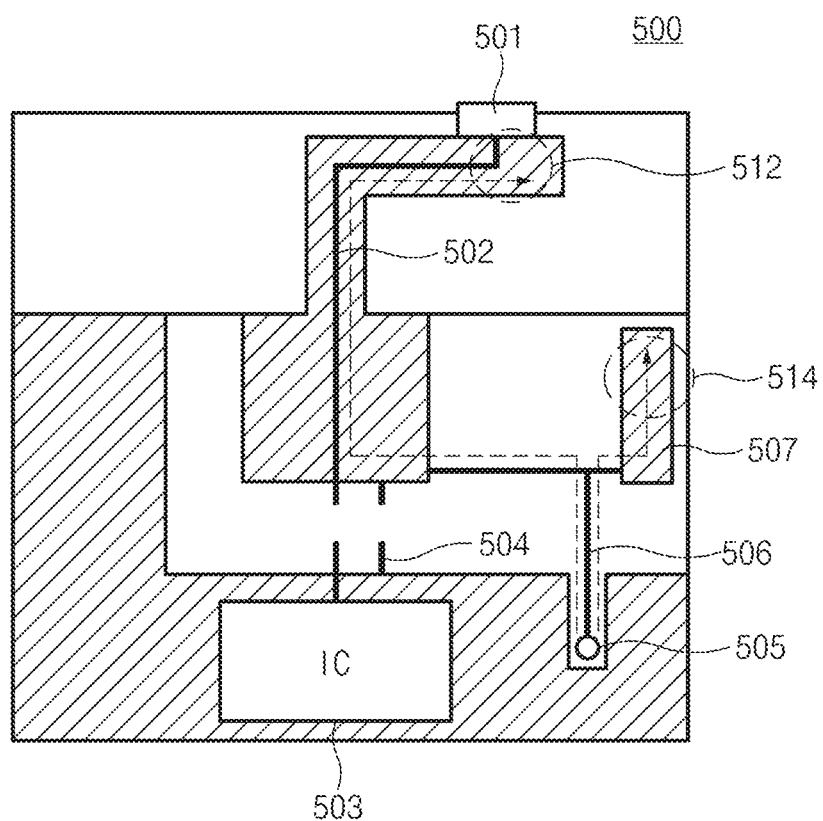
FIG. 5B illustrates an internal diagram of an electronic device and illustrates a flow of a communication signal generated in the electronic device according to an embodiment of the present disclosure.

FIGS. 5A and 5B illustrate internal diagrams of an electronic device and illustrate flows of a communication signal generated by the electronic device according to various embodiments of the present disclosure.

Referring to FIG. 5A, an electronic device 500 is illustrated, such that in comparison to the electronic device 320 of FIG. 3B, the electronic device 500 may further include a ground plate 507 in addition to the ground plate of the signal transmission unit and the ground plate of the signal processing unit. Further, FIG. 5A illustrates a power button 501, a signal line 502, a ground connection line 504, a communication line 506 which is connected to a communication signal generation unit 505, and a signal processing unit (e.g., an IC) 503.

Referring to FIG. 5B, an electronic device 500 is illustrated which relates to a flow of a communication signal therein. The electronic device 500 includes a signal line 502 and a ground connection line 504 including an inductor or an RFC, which are opened, and a communication line 506 that may be shorted in correspondence to the communication signal of high frequency. Accordingly, the electronic device 500 may transmit the communication signal generated by a communication signal generation unit 505 to each of a ground plate of a signal transmission unit and a ground plate 507 through the communication line 506.

In this case, an area 512 on the ground plate of the signal transmission unit and an area 514 on the additional ground plate 507 may respectively serve as a radiator. In this case, since the electronic device 500 includes two radiators, it may implement a dual-band antenna. The electronic device also includes a power button 501 and a signal processing unit (e.g., an IC) 503.

The electronic devices 320, 330, and 500 are described with reference to FIGS. 3A to 5B as various embodiments of the present disclosure for the power button. Hereinafter, various embodiments of the present disclosure for an electronic device 600 including a plurality of buttons will be described with reference to FIGS. 6A and 6B.

Figure 6A:
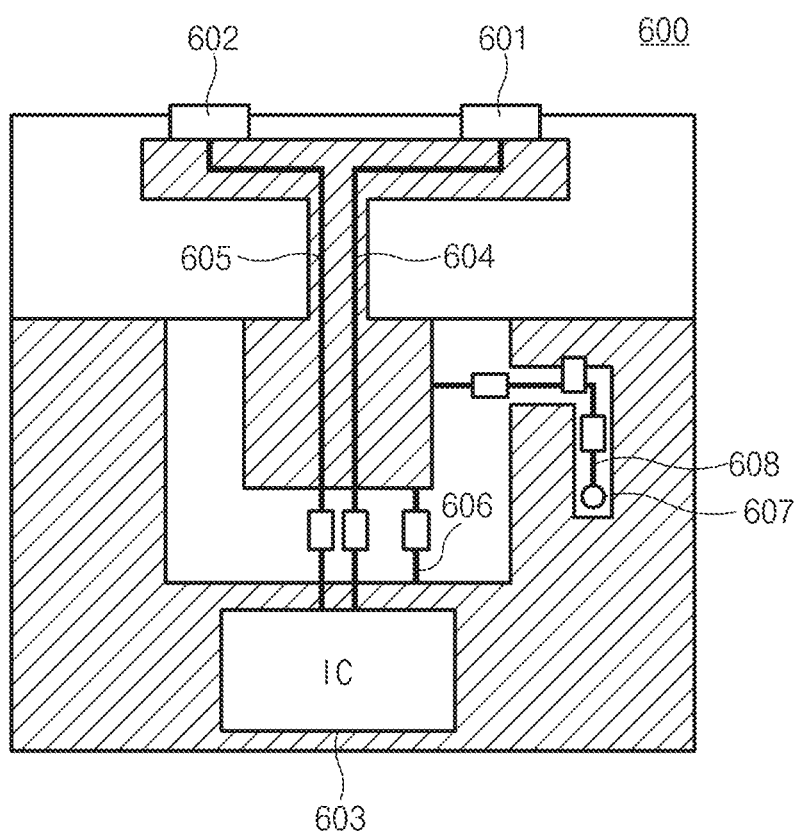
FIG. 6A illustrates an internal diagram of an electronic device and illustrates a flow of a communication signal generated in the electronic device according to an embodiment of the present disclosure.
Figure 6B:
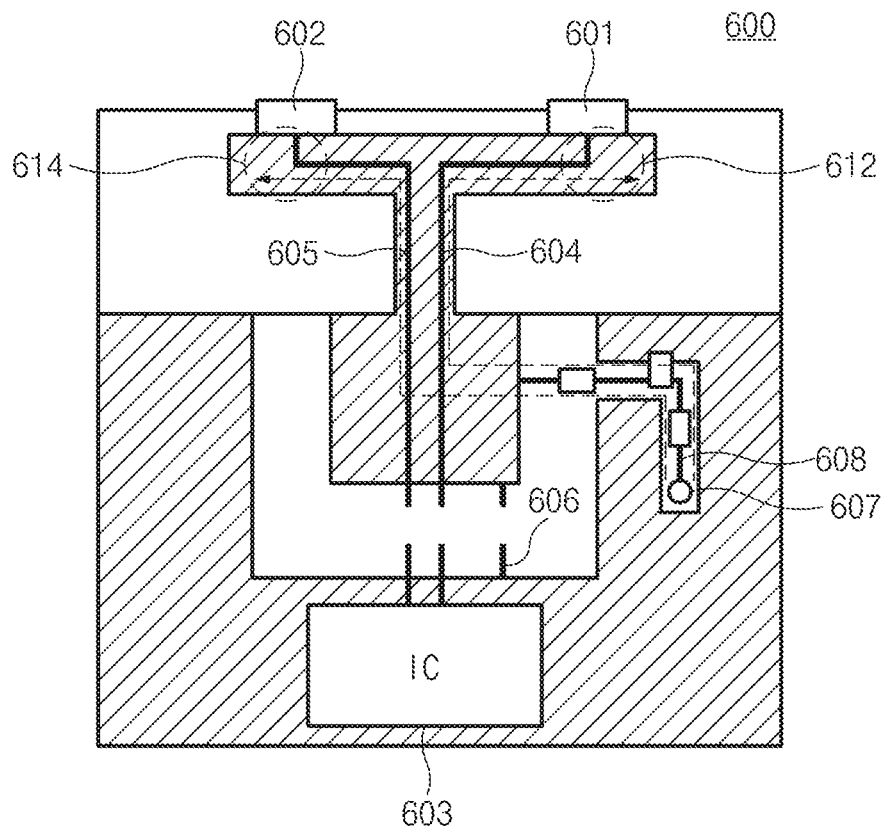
FIG. 6B illustrates an internal diagram of an electronic device and illustrates a flow of a communication signal generated in the electronic device according to an embodiment of the present disclosure.

FIGS. 6A and 6B illustrate internal diagrams of an electronic device and illustrate flows of a communication signal generated by the electronic device according to various embodiments of the present disclosure.

Referring to FIG. 6A, an electronic device 600 is illustrated, where the electronic device 600 may include a first volume button 601, a second volume button 602, a signal processing unit (e.g., an IC) 603, a first signal line 604, a second signal line 605, a ground connection unit 606, a communication signal generation unit 607, and a communication line 608. In this case, a signal transmission unit may include one ground plate and at least a part of the first signal line 604 and the second signal line 605 may be formed on one ground plate included in the signal transmission unit.

However, according to another embodiment of the present disclosure, at least a part of the first signal line 604 and the second signal line 605 may be formed on respective ground plates and the respective ground plates where the first signal line 604 and the second signal line 605 are formed may be coupled to each other.

Referring to FIG. 6B, an electronic device 600 is illustrated, which relates to a flow of a communication signal therein. The electronic device 600 includes a first signal line 604, a second signal line 605, and a ground connection line 606 including an inductor or an RFC, which are opened and a communication line 608 that may be shorted in correspondence to the communication signal of a high frequency. Accordingly, the electronic device 600 may transmit a communication signal generated by a communication signal generation unit 607 from the communication signal generation unit 607 to a ground plate of a signal transmission unit through the communication line 608. In this case, the communication signal may be divided, and each divided communication signal may be transmitted to an area 612, which corresponds to a first volume button 601, of the ground plate of the signal transmission unit, and to an area 614, which corresponds to a second volume button 602, of the ground plate of the signal transmission unit.

In this case, the area 612 corresponding to the first volume button 601 and the area 614 corresponding to the second volume button 602, on the ground plate of the signal transmission unit, may respectively serve as a radiator. In this case, since the electronic device 600 includes two radiators, it may implement a dual-band antenna.

Further, the electronic device 600 may include a signal processing unit (e.g., an IC) 603.

Hereinafter, a method of implementing a tri-band antenna will be described with reference to FIGS. 7A and 7B.

Figure 7A:
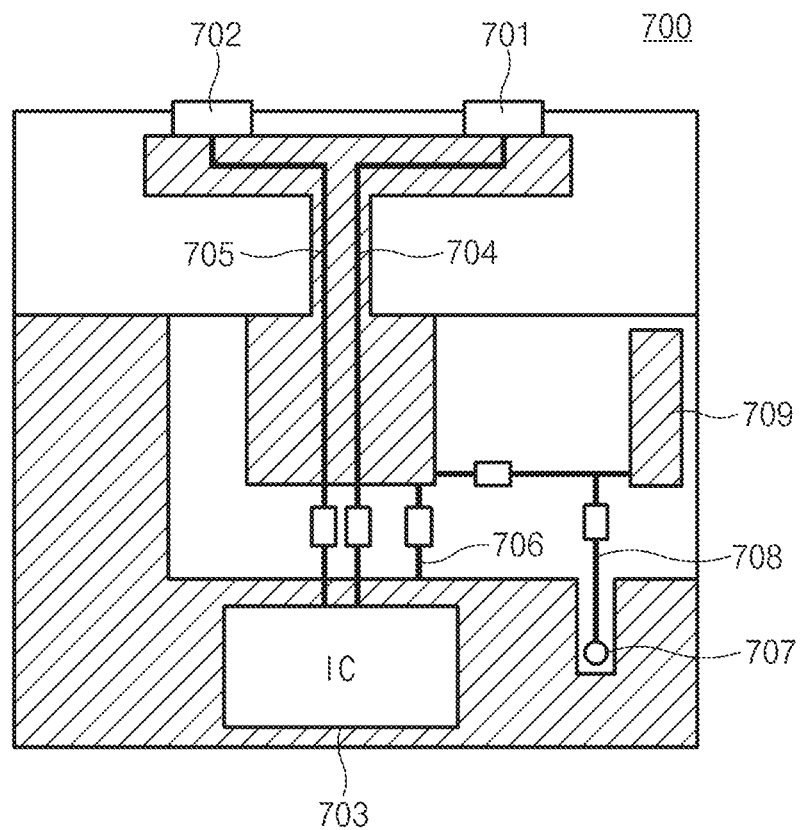
FIG. 7A illustrates an internal diagram of an electronic device and illustrates a flow of a communication signal generated in the electronic device according to an embodiment of the present disclosure.
Figure 7B:
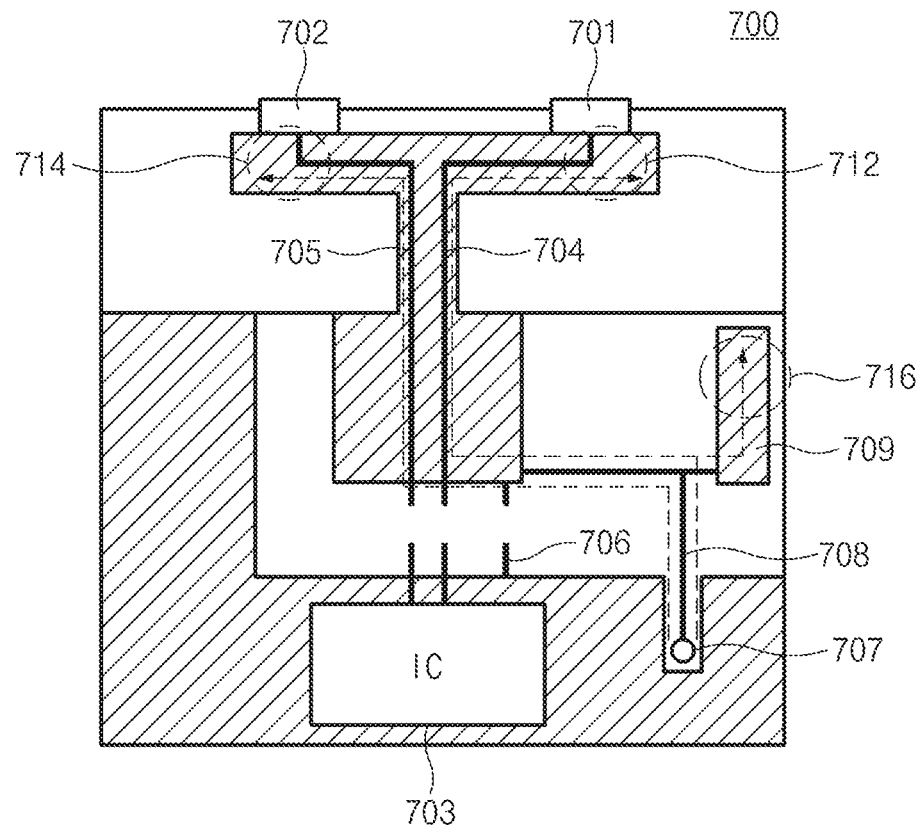
FIG. 7B illustrates an internal diagram of an electronic device and illustrates a flow of a communication signal generated in the electronic device according to an embodiment of the present disclosure.

FIGS. 7A and 7B illustrate internal diagrams of an electronic device and illustrate flows of a communication signal generated by the electronic device according to various embodiments of the present disclosure.

Referring to FIG. 7A, an electronic device 700 is illustrated, such that in comparison to the electronic device 600 of FIG. 6A, the electronic device 700 may further include an additional ground plate 709 in addition to a ground plate of a signal transmission unit and a ground plate of a signal processing unit (e.g., an IC) 703.

Further, the electronic device 700 of FIG. 7A may include a first volume button 701, a second volume button 702, a first signal line 704, a second signal line 705, a ground connection unit 706, a communication signal generation unit 707, and a communication line 708.

Referring to FIG. 7B an electronic device 600 is illustrated, which relates to a flow of a communication signal therein. The electronic device 700 includes a first signal line 704, second signal line 705, and ground connection line 706 including an inductor or an RFC, which are opened and a communication line 708 that may be shorted in correspondence to the communication signal of a high frequency. Accordingly, the electronic device 700 may transmit the communication signal generated by a communication signal generation unit 707 to each of the ground plates of the signal transmission unit and a ground plate 709 through the communication line 708. In this case, the communication signal may be divided, and the each divided communication signal may be transmitted to an area 712, which corresponds to a first volume button 701, of the ground plate of the signal transmission unit, and to an area 714, which corresponds to a second volume button 702, of the ground plate of the signal transmission unit.

In this case, each of the area 712 corresponding to the first volume button 701 and the area 714 corresponding to the second volume button 702, on the ground plate of the signal transmission unit, and an area 716 on the additional ground plate 709 may respectively serve as a radiator. In this case, since the electronic device 700 includes three radiators, it may implement a tri-band antenna.

Further, the electronic device 700 of FIG. 7B may include a signal processing unit (e.g., an IC) 703.

Figure 8:
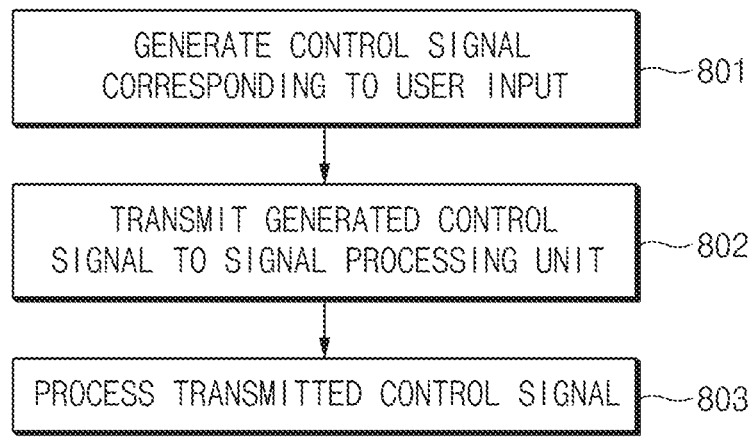
FIG. 8 is a flowchart illustrating a communication method of an electronic device according to an embodiment of the present disclosure.

FIG. 8 is a flowchart illustrating a communication method of an electronic device according to an embodiment of the present disclosure. The communication method of an electronic device according to the embodiment shown in FIG. 8 may include operations processed in time series in the electronic devices shown in FIGS. 1, 7A and 7B. Accordingly, even the omitted content below, which describes the electronic devices of FIGS. 1 to 7B, may be applied to the communication method of an electronic device according to an embodiment shown in FIG. 8.

Referring to FIG. 8, a flowchart is illustrated, such that in operation 801, a control signal generation unit of an electronic device may generate a control signal corresponding to a user input. For example, the user input may be pressing a power button of the electronic device or pressing a volume up or down button of the electronic device.

In operation 802, a signal transmission unit of the electronic device may transmit the control signal generated in operation 801 to a signal processing unit. At this point, the control signal may be transmitted through a signal line that mutually connects the control signal generation unit and the signal processing unit.

In operation 803, the signal processing unit of the electronic device may process the transmitted control signal.

According to various embodiments of the present disclosure, when the communication signal generation unit of the electronic device generates a communication signal, the electronic device may open the signal line and short a communication so as to transmit the generated communication signal to the ground plate of the signal transmission unit through the connected communication line.

According to any one of the above-mentioned technical solutions of the present disclosure, various embodiments of the present disclosure can implement an antenna by using a component in an electronic device. That is, various embodiments of the present disclosure can implement an antenna through a simple method, without mounting a complete antenna device in the electronic device.

An antenna implemented according to various embodiments of the present disclosure can obtain a space easily and have a sufficient length of a radiator. Additionally, the antenna can have a simple design and high radiation efficiency and can be insensitive to noise interference.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a control signal generation unit configured to generate a control signal corresponding to a user input;
 a signal transmission unit configured to transmit the generated control signal to a signal processing unit;
 the signal processing unit configured to process the transmitted control signal;
 a signal line configured to connect the control signal generation unit and the signal processing unit and carry the control signal between the control signal generation unit and the signal processing unit, based on the control signal; and
 a ground connection unit configured to connect a ground plate of the signal transmission unit and a ground plate of the signal processing unit,
 wherein the ground plate of the signal transmission unit and the ground plate of the signal processing unit are spaced from each other, and
 wherein the ground plate of the signal transmission unit is used as a radiator.

2. The electronic device of claim 1, further comprising:
 a communication signal generation unit configured to generate a communication signal; and
 a communication line configured to connect the ground plate of the signal transmission unit and the communication signal generation unit based on the communication signal.

3. The electronic device of claim 2,
 wherein the signal line is shorted when the control signal is generated, and
 wherein the communication line is opened when the communication signal is not generated.

4. The electronic device of claim 2, wherein the signal line comprises at least one of an inductor or a radio frequency choke (RFC).

5. The electronic device of claim 2, wherein the communication line comprises a matching circuit.

6. The electronic device of claim 2,
wherein the signal line is opened when the control signal is not generated, and
wherein the communication line is shorted when the communications signal is generated.

7. The electronic device of claim 2, further comprising another radiator connected to the ground plate of the signal transmission unit and the communication signal generation unit.

8. The electronic device of claim 1, wherein the user input corresponds to one of a manipulation of at least one of a volume button, a power button, and a home button of the electronic device and an object detected by a sensor of the electronic device.

9. The electronic device of claim 1, wherein the signal transmission unit is formed of one of a printed circuit board (PCB), a Flexible PCB (FPCB), and metal.

10. The electronic device of claim 1, wherein the ground connection unit is shorted based on the generation of the control signal.

11. The electronic device of claim 1,
wherein the electronic device includes a plurality of signal generation units, and
wherein the signal transmission unit comprises a plurality of signal lines that respectively connect the plurality of signal generation units and the signal processing unit.

12. The electronic device of claim 11,
wherein the signal transmission unit comprises one ground plate, and
wherein the plurality of signal lines is formed on the one ground plate.

13. The electronic device of claim 1, further comprising another radiator implemented according to a necessary frequency band.

14. A communication method of an electronic device, the method comprising:

generating, by a control signal generation unit, a control signal corresponding to a user input;

transmitting, by a signal transmission unit, the generated control signal to a signal processing unit;

processing, by the signal processing unit, the transmitted control signal; and connecting, by a signal line, the control signal generation unit and the signal processing unit and carrying the control signal between the control signal generation unit and the signal processing unit, based on the control signal, wherein a ground plate of the signal transmission unit and a ground plate of the signal processing unit are spaced from each other, and wherein the ground plate of the signal transmission unit is used as a radiator.

15. The method of claim 14, further comprising:

generating, by a communication signal generation unit, a communication signal;

shorting a communication line that connects the communication signal generation unit and the ground plate of the signal transmission unit when the communication signal is generated;

transmitting the generated communication signal from the communication signal generation unit to the ground plate of the signal transmission unit through the communication line; and using the ground plate of the signal transmission unit as the radiator.

16. The method of claim 15,
wherein the signal line is shorted based on a frequency of the control signal to transmit the control signal, and
wherein the communication line is shorted based on a frequency of the communication signal to transmit the communication signal.

* * * * *